United States Patent [19]

Kalinowski et al.

[11] Patent Number: 5,928,794
[45] Date of Patent: Jul. 27, 1999

[54] ADDITION CURABLE COMPOSITION HAVING SELF ADHESION TO SUBSTRATES

[75] Inventors: Robert Edward Kalinowski, Auburn; Mary Kay Tomalia, Midland, both of Mich.; Andreas Thomas Franz Wolf, Braine-l'Alleud, Belgium; Ming Hsiung Yeh, New Freedom, Pa.

[73] Assignees: Dow Corning GmbH, Wiesbaden, Germany; Dow Corning Corporation, Midland, Mich.

[21] Appl. No.: 08/984,397

[22] Filed: Dec. 3, 1997

Related U.S. Application Data

[63] Continuation-in-part of application No. 08/772,808, Dec. 24, 1996, abandoned.
[51] Int. Cl.$^6$ .................................................. C08G 77/08
[52] U.S. Cl. ...................... 428/447; 525/106; 525/100; 525/446; 525/479; 525/105; 528/15; 427/387
[58] Field of Search ...................................... 525/100, 105, 525/106, 446, 479; 528/15; 428/447; 427/387

[56] References Cited

U.S. PATENT DOCUMENTS 5,409,995  4/1995  Iwahara et al. .......................... 525/100
5,595,826  1/1997  Gray et al. ............................... 428/450

FOREIGN PATENT DOCUMENTS 20755644   3/1990   Japan .
6-279691  10/1994   Japan .
WO 9621633  7/1996  WIPO .

OTHER PUBLICATIONS

Macosko, C.W. & Saam, J.C., "The Hydrosilylation Cure of Polyisobutene", pp. 48–49.

Primary Examiner—Margaret W. Glass
Attorney, Agent, or Firm—Patricia M. Scaduto

[57] ABSTRACT

This invention relates to the preparation of an addition curable composition having self adhesion to substrates. The addition curable composition comprises an organic polymer having on average at least 1.4 alkenyl groups per molecule, a crosslinker having on average at least 1.4 hydrosilyl groups per molecule, a platinum group metal containing catalyst, an alkoxy silicon compound and a titanium compound having Ti—O—C bonds. Another embodiment of this invention is a method of adhering the addition curable composition to a substrate surface.

30 Claims, No Drawings

ADDITION CURABLE COMPOSITION HAVING SELF ADHESION TO SUBSTRATES

This application is a continuation-in-part of application Ser. No. 08/772,808 filed Dec. 24, 1996 which application is now abandoned.

BACKGROUND OF THE INVENTION

This invention relates to an addition curable composition containing alkenyl functional organic polymers and hydrosilyl functional crosslinkers having self adhesion to substrates.

BACKGROUND INFORMATION

Saam and Macosko, Polym. Prepr., 26 (2) 48-9 (1985) describe a platinum catalyzed addition reaction between a terminally unsaturated polyisobutylene (PIB) polymer and bifunctional $HMe_2SiOMe_2SiOSiMe_2H$ such that a copolymer forms or a tetrafunctional $Si(OSiMe_2H)_4$ which crosslinks the PIB polymer into an elastomer, in each case where Me is a methyl group.

Japanese Patent Application Kokai No. 2-75644 describes a curable resin composition comprising (A) a saturated hydrocarbon polymer containing at least one alkenyl group per molecule, (B) a polyorganohydrogen siloxane containing at Least two hydrogen atoms bonded to silicon atoms per molecule, and (C) a platinum catalyst.

U.S. Pat. No. 5,409,995 describes a curable composition comprising (C) an organic curing agent having at least two hydrosilyl groups per molecule, prepared as described therein, (D) an organic polymer having at least one alkenyl group per molecule, and (E) a hydrosilyation catalyst.

Japanese Patent Application Kokai No. 6-279691 describes an addition curable composition having essential components (A) a hydrocarbon type curing agent with a molecular weight of 30,000 or less which contains at least 2 hydrosilyl groups per molecule; (B) a saturated hydrocarbon type polymer with a molecular weight of 100,000 or less which contains at least 1 alkenyl group per molecule, (C) a hydrosilylation catalyst and (D) an adhesion promoter.

PCT Application WO9621633, published Jul. 18, 1996, describes an addition curable composition having essential components (A) a hydrocarbon having at least 1 alkenyl group in its monomer molecule and a molecular weight of 500 to 300,000; (B) a hardening agent having at least 2 silyl groups in its molecule; (C) a hydrosilylating agent; and (D) a tackifier.

Silicone compounds are known for their weather resistance, water resistance and thermal stability, however they tend to be more expensive than their organic counterparts which don't have as good a property profile. Silicon modified organic materials may provide another option. For example, addition curable compositions which utilize a hydrosilyl functional or Si-H containing compound to crosslink an alkenyl functional organic polymer are useful when cured as sealants, adhesives, coatings, molding and potting compounds, gels and additives. It is advantageous to have addition curable compositions containing alkenyl functional organic polymers and hydrosilyl functional crosslinkers which adhere to substrates without the use of a separate primer.

The inventors have unexpectedly found that the use of an alkoxy silicon compound, a titanium compound having Ti—O—C bonds and in a referred embodiment an (epoxyfunctional organo) trialkoxysilane in an addition curable composition comprising an alkenyl functional organic polymer, hydrosilyl functional crosslinker and catalyst, provides adhesion of the cured composition to substrates without the use of a separate primer.

One objective of this invention is to prepare an addition curable composition comprising an alkenyl functional organic polymer, a hydrosilyl functional crosslinker, an alkoxy silicon compound, a titanium compound having Ti—O—C bonds and in a preferred embodiment an (epoxyfunctional organo) trialkoxysilane which has self adhesion to substrates.

Another objective is to describe a method of adhering these addition curable compositions to a substrate surface without the use of a separate primer.

SUMMARY OF THE INVENTION

The objectives of this invention can be achieved by preparing an addition curable composition comprising an alkenyl functional organic polymer and hydrosilyl functional crosslinker having self adhesion to substrates. The addition curable composition comprises an organic polymer having on average at least 1.4 alkenyl groups per molecule, a crosslinker having on average at least 1.4 hydrosilyl groups per molecule, a platinum group metal-containing catalyst, an alkoxy-silicon compound and a titanium compound having Ti—O—C bonds.

DETAILED DESCRIPTION OF THE INVENTION

This invention relates to an addition curable composition comprising a product formed from components comprising:

(A) 100 parts by weight of an organic polymer having on average at least 1.4 alkenyl groups per molecule;

(B) an amount sufficient to cure the composition of a crosslinker having on average at least 1.4 hydrosilyl groups per molecule;

(C) a platinum group metal-containing catalyst in an amount sufficient to effect curing of the composition;

(D) 0.1 to 4 parts by weight of an alkoxy-silicon compound selected from alkyl orthosilicates and alkylpolysilicates, where the alkyl groups of the alkyl orthosilicates and the alkylpolysilicates are methyl, ethyl, propyl or butyl, and (E) 0.1 to 1 part by weight of a titanium compound having Ti—O—C bonds.

Another preferred embodiment of this invention is a method of adhering an addition curable composition to a substrate surface comprising the steps of:

(i) treating a substrate surface with moisture or a moisture containing mixture to form a discontinuous film of moisture on the substrate surface; and (ii) applying an addition curable composition comprising a product formed from the components described above.

Component (A) is an organic polymer having on average at least 1.4 alkenyl groups per molecule. The organic polymer may be linear or ranched and may be a homopolymer, copolymer or terpolymer. The organic polymer may also be present as a mixture of different organic polymers so long as there is on average at least 1.4 alkenyl groups per polymer molecule. Specific examples of the polymer chain include a polyether such as polyoxyethylene, polyoxypropylene, polyoxytetramethylene, polyoxyethylene-polyoxypropylene; a polyester prepared by a condensation of a dibasic acid such as adipic acid and a glycol or by a ring-opening polymerization of lactones; ethylene-propylene copolymer; a polybutylene such as polyisobutylene; a copolymer of isobutylene with isoprene or the like; polychloroprene; polyisoprene; a copolymer of isoprene with butadiene, acrylonitrile, styrene or the like; polybutadiene; a copolymer of butadiene with styrene, acrylonitrile or the like; and a polyolefin prepared by hydrogenating polyisoprene, polybutadiene, or a copolymer of isoprene or butadiene with acrylonitrile, styrene or the like.

The preferred organic polymer comprises a homopolymer or a copolymer selected from the group consisting of a polyether, a polyester, a polybutylene where the polybutylene chain may comprise repeat units having the following formulas

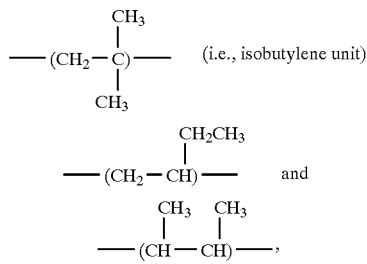

as well as rearranged products such as

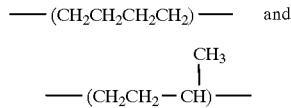

a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

It is more preferred that the organic polymer comprises a homopolymer or copolymer wherein at least 50 mole percent of the repeat units are isobutylene units of the following structure:

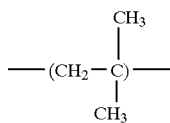

One or more hydrocarbon monomers, such as isomers of butylene, styrene, derivatives of styrene, isoprene and butadiene may be copolymerized with the isobutylene, the preferred co-monomer being selected from 1-butene, α-methylstyrene and isoprene. It is even more preferred that the organic polymer comprise at least 80 mole percent of the isobutylene repeat units described above. Most preferably, the organic polymer, other than the alkenyl groups, is a homopolymer consisting essentially of isobutylene repeat units.

The alkenyl groups of the organic polymer are not limited and include for example, vinyl, allyl, 1-hexenyl and decadecenyl, preferably allyl. In preferred embodiments, a group X may bond the alkenyl group to the main chain of the organic polymer, as described by formula:

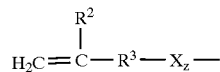

wherein $R^2$ is a hydrogen atom or a methyl radical, $R^3$ is a divalent hydrocarbon radical having between 1 and 18 carbon atoms, and z is 0 or 1. The group X bonds with $R^3$ of the alkenyl group through a group other than carbon, forming an ether, ester, carbonate, amide, urethane or siloxane linkage, preferably an ether linkage, to the main chain of the organic polymer.

The alkenyl groups may be found pendant along the polymer chain or at the chain ends, with it being preferable for the alkenyl groups to be at the chain ends. It is most preferred that the majority of the organic polymer molecules have an alkenyl group at each chain end.

While there must be on average at least 1.4 alkenyl groups per organic polymer molecule, it is preferred that each polymer molecule have on average 1.8 to 8 alkenyl groups with 1.8 to 4 alkenyl groups on average per molecule being more preferred.

The alkenyl group may be introduced into the organic polymer by known methods. Typically, the alkenyl groups may be introduced after polymerization or during polymerization.

The method for introducing the alkenyl group after the polymerization includes, for example, a method comprising reacting an organic polymer having a functional group such as a hydroxyl group or an alkoxide group at the chain end, in the main chain or in the side chain, with an organic compound having an alkenyl group and an active group which is reactive to said functional group so as to introduce the alkenyl group at the chain end, in the main chain or in the side chain. Specific examples of the organic compound having the alkenyl group and the active group which is reactive to said functional group are a $C_3$–$C_{20}$ unsaturated aliphatic acid, acid halide and acid anhydride such as acrylic acid, methacrylic acid, vinyl acetate, acrylic chloride and acrylic bromide; a $C_3$–$C_{20}$ unsaturated aliphatic acid substituted halide such as allyl chloroformate ($CH_2CHCH_2OCOCl$) and allyl bromoformate ($CH_2CHCH_2OCOBr$); allyl chloride, allyl bromide, vinyl (chloromethyl)benzene, allyl(chloromethyl)benzene, allyl (bromomethyl)benzene, allyl chloromethyl ether, allyl (chloromethoxy)benzene, 1-butenyl chloromethyl ether, 1-hexenyl(chloromethoxy)benzene, allyloxy(chloromethyl) benzene and isocyanate functional $C_3$–$C_{20}$ unsaturated aliphatic organic compounds or isocyanate functional silanes having alkenyl groups, such as $Vi(CH_3)_2Si(CH_2)_3NCO$ where Vi is vinyl.

The method for introducing the alkenyl group during the polymerization includes, for example, a method comprising introducing the alkenyl group in the main chain or at the chain end of the polymer by using a vinyl monomer which has an alkenyl group having a low radical reactivity in the molecule such as allyl methacrylate and allyl acrylate or a radical chain transfer agent which ha,s an alkenyl group having a low radical reactivity such as allyl mercaptan when the organic polymer is prepared by a radical polymerization.

The bonding manner of the alkenyl group to the main chain of the organic polymer is not limited. The alkenyl group may directly bond to the main chain of the organic polymer by a carbon-carbon linkage, or it may bond to the main chain of the organic polymer through an ether, ester, carbonate, amide, urethane or siloxane linkage.

The butylene polymers useful herein may be prepared by methods known in the art, such as described in Kennedy, et al. U.S. Pat. No. 4,758,631 which is hereby incorporated by reference. One telechelic butylene polymer, for example, is available from Kaneka Company (Japan) under the tradename EPION™.

The number average molecular weight of the organic polymer may be from 500 to 300,000, preferably from 5000 to 20,000 and most preferably from 8000 to 15,000.

The present composition requires the presence of an amount sufficient to cure the composition of a crosslinker having on average at least 1.4 hydrosilyl or Si—H groups per molecule (Component (B)). Although the crosslinker must contain on average at least 1.4 hydrosilyl groups per molecule and no more than one silicon-bonded hydrogen atom per silicon atom, there is no other restriction on the crosslinker. For example, the crosslinker may be an organic molecule containing the required hydrosilyl groups as described in Iwahara, et al, U.S. Pat. No. 5,409,995 which is hereby incorporated by reference.

Preferably, the crosslinker is an organohydrogensilane or organohydrogensiloxane where the remaining valences of the silicon-bonded hydrogen atoms are satisfied, for example, by oxygen atoms or monovalent hydrocarbon radicals comprising one to seven carbon atoms.

The monovalent hydrocarbons radicals can be, for example, alkyls such as methyl, ethyl, propyl, tertiary butyl, and hexyl; cycloalkyls such as cyclohexyl; aryls such as phenyl and tolyl; and halogen substituted alkyls such as 3,3,3-trifluoropropyl and perfluoropropyl. Preferred is when all of the monovalent hydrocarbon radicals are methyl.

Organohydrogensiloxanes are preferred as the crosslinker and examples of organohydrogensiloxanes useful as crosslinkers in the present composition are described, for example, in Lee et al., U.S. Pat. No. 3,989,668; Jensen, U.S. Pat. No. 4,753,978 and Iwahara, et al, U.S. Pat. No. 5,409,995, each of which are incorporated herein by reference. The organohydrogensiloxane crosslinker can be a homopolymer, a copolymer or mixtures thereof, containing for example, diorganosiloxy units, organohydrogensiloxy units, triorganosiloxy units and $SiO_2$ units. The organohydrogensiloxane crosslinker can be linear, cyclic and branched polymers and copolymers. It is more preferred to add both a cyclic organohydrogensiloxane and a linear organohydrogensiloxane.

The most preferred crosslinkers are selected from methylhydrogen siloxane cyclics $[MeHSiO]_s$ where s is from 4 to 10 and methylhydrogen siloxane linears $(Me)_3SiO((Me)(H)SiO)_m((Me)_2SiO)_nSi(Me)_3$ where m is from 3 to 10, more preferably 5, and n is from 1 to 5, more preferably 3, in each case where Me is methyl.

The amount of the crosslinker useful in the present composition is that sufficient to cure the composition. Generally, a useful amount of crosslinker is that amount sufficient to provide a molar ratio of hydrosilyl groups to alkenyl groups of the organic polymer within a range of 0.65:10 to 10:1. Preferred is where the molar ratio of hydrosilyl groups of the crosslinker to alkenyl groups of the organic polymer is within a range of about 1:1 to 5:1. More preferred is where the molar ratio of hydrosilyl groups of the crosslinker to alkenyl groups of the organic polymer is within a range of about 1:1 to 2.2:1.

The crosslinker may be added as a single species or as a mixture of two or more different species. It is preferred to add the crosslinker as a mixture of two or more species.

A platinum group metal-containing catalyst (Component (C)) is used in the curable composition in an amount sufficient to promote curing of the composition. The platinum group metal-containing catalyst can be any such catalyst which is known to catalyze hydrosilylation reactions. By "platinum group metal" it is meant ruthenium, rhodium, palladium, osmium, iridium, and platinum. A group of platinum group metal-containing catalysts particularly useful in the present composition are the platinum complexes prepared as described by Willing, U.S. Pat. No. 3,419,593, and Brown et al, U.S. Pat. No. 5,175,325, each of which is hereby incorporated by reference to show such complexes and their preparation. Preferred catalysts are solutions containing complexes of platinum with vinylsiloxane. Other examples of useful platinum group metal-containing catalyst can be found in Lee et al., U.S. Pat. No. 3,989,668; Chang et al., U.S. Pat. No. 5,036,117; Ashby, U.S. Pat. No. 3,159, 601; Lamoreaus, U.S. Pat. No 3,220,972; Chalk et al., U.S. Pat. No. 3,296,291; Modic, U.S. Pat. No. 3,516,946; Karstedt, U.S. Pat. No. 3,814,730; and Chandra et al, U.S. Pat. No. 3,928,629 all of which are hereby incorporated by reference to show useful platinum group metal-containing catalyst and methods for their preparation.

The amount of platinum group metal-containing catalyst useful in effecting curing of the present composition is not narrowly limited as long as there is a sufficient amount present to accelerate a reaction between the hydrosilyl groups and the alkenyl groups. The appropriate amount of the platinum group metal-containing catalyst will depend upon the particular catalyst used. In general as low as about 0.1 parts by weight of platinum group metal based on 1 million parts by weight of organic polymer may be useful (ie. 0.1 ppm). Preferably the amount of platinum group metal is at least 5 ppm. More preferred is from about 10 ppm to about 200 ppm of platinum group metal.

The platinum group metal-containing catalyst may be added as a single species or as a mixture of two or more different species. Adding the catalyst as a single species is preferred.

The alkoxy-silicon compound, Component (D), can be an alkyl orthosilicate or a partially hydrolyzed alkyl orthosilicate where the alkyl groups have up to about 4 carbon atoms. The alkyl groups may be the same or different. Alkyl orthosilicates include ethyl orthosilicate, methyl orthosilicate, n-propyl orthosilicate and butyl orthosilicate. The partially hydrolyzed alkyl orthosilicates which are also known as alkylpolysilicates include, for example, ethylpolysilicate, n-propylpolysilicate arid butylpolysilicate.

The alkoxy-silicon compound is preferably an alkyl orthosilicate. It is more preferred that the alkoxy-silicon compound is ethyl orthosilicate or n-propyl orthosilicate, with ethyl orthosilicate being most preferred.

The alkoxy-silicon compound is added in an amount from 0.1 to 4 parts by weight based on 100 parts by weight of organic polymer. It is preferred for improved adhesion to use from 0.5 to 3.5 parts alkoxy-silicon compound. It is more preferred to use from 0.8 to 3.5 parts alkoxy-silicon compound. The alkoxy-silicon compound may be added as a single species or as a mixture of two or more different species.

The addition curable compositions of this invention include a titanium compound having Ti—O—C bonds (Component (E)). These titanium compounds aid in the shortening of time for development of adhesion between the cured composition and the substrates as well as assisting in the adhesion process. Examples of titanium compounds useful in this invention include tetraalkyltitanates such as tetraisopropyltitanate, tetrabutyltitanate, tetraoctyltitanate and tetrakis(2-ethylhexyl)titanate; chelated titanates such as dialkoxyacetylacetonate titanate chelate and dialkoxyethylacetoacetate titanate chelate, where the alkoxy group includes isopropoxy, isobutoxy, etc, and other titanium compounds such as $(CH_2CH_2CH_2O)_3TiOTi(OCH_2CH_2CH_3)_3$. Preferred titanium compounds are the tetraalkyltitanates and the chelated titanates. More preferred are tetraisopropyltitanate and titanium diisopropoxy-bis-ethylacetoacetate chelate with titanium d-isopropoxy-bis-ethylacetoacetate chelate being most preferred.

The amount of titanium compound needed in this invention will vary depending on the actual titanium compound used and the other ingredients used, for example, the type of crosslinker and can be determined experimentally. Typically, the titanium compound may be added in amounts from 0.1 to 1 part by weight based on 100 parts by weight of organic polymer. It is preferred for improved adhesion to use from 0.1 to 0.6 parts titanium compound. It is more preferred to use from 0.1 to 0.5 parts titanium compound. The titanium compound may be added as a single species or as a mixture of two or more different species.

An optional ingredient, which also assists in the adhesion of the composition upon curing, is an (epoxy-functional organo)trialkoxysilane (Component (F)). This ingredient is a trialkoxysilane functionalized with an organic substituent containing an epoxy group. Typically the alkoxy radicals of the (epoxy-functional organo)trialkoxysilane may be the same or different and are usually selected from alkoxy radicals having 1 to 4 carbon atoms such that the alkoxy radicals are readily hydrolyzable upon contact with water. For example, the alkoxy radicals may include methoxy, ethoxy, propoxy, and butoxy. The structure of the organic substituent bearing the epoxy group may vary. Commercially available useful (epoxy-functional organo) trialkoxysilanes include 3-glycidoxypropyltrimethoxysilane and beta-(3,4-epoxycyclohexyl) ethyltrimethoxysilane. 3-glycidoxypropyltrimethoxysilane is preferred because of its general availability.

The (epoxy-functional organo)trialkoxysilane may be added in amounts up to 1 part by weight based on 100 parts by weight of organic polymer. It is preferred to use from 0.1 to 1 part (epoxy-functional organo)trialkoxysilane, on the same basis. It is more preferred to use from 0.3 to 0.8 part (epoxy-functional organo)trialkoxysilane, on the same basis. The (epoxy-functional organo)trialkoxysilane may be added as a single species or as a mixture of two or more different species.

The present composition may cure rapidly at room temperature. To hinder this curing process an inhibitor may be added to the composition. The inhibitor can be any of those materials known to inhibit the catalytic activity of platinum group metal-containing catalyst. By the term "inhibitor" it is meant a material that retards the room temperature curing of the composition when incorporated in the composition at less than about 10 weight percent of the composition, without preventing the elevated temperature curing of the composition.

Inhibitors for platinum group metal-containing catalysts are well known in the art. A preferred class of inhibitors useful in the present composition are acetylenic alcohols as described in Kookootsedes et al., U.S. Pat. No. 3,445,420, which is incorporated herein by reference. Such acetylenic alcohols are exemplified by ethynylcyclohexanol and methylbutynol. Other examples of classes of inhibitors which may be useful in the present composition are described in Chung et al., U.S. Pat. No. 5,036,117, which is incorporated herein by reference.

The amount of inhibitor useful in the present composition is not known to be critical and can be any amount that will retard the platinum group metal-containing catalyst catalyzed reaction of the hydrosilyl groups with the alkenyl groups, while not preventing the reaction at elevated temperatures. The specific amount of inhibitor to be used will depend upon the particular inhibitor used, the concentration and type of catalyst, and the nature and amounts of organic polymer and crosslinker. Generally, when an inhibitor is used it is preferred that at least one mole of inhibitor be present for each mole of platinum group metal in the composition and that the inhibitor not exceed one weight percent of the composition.

In addition to the above ingredients, the composition may include additives which impart or enhance certain properties of the cured composition or facilitate processing of the curable composition. Typical additives include, but are not limited to, reinforcing or extending fillers, plasticizers, molecular sieve dessicants, functional and non-functional diluents, pigments, dyes, and heat and/or ultraviolet light stabilizers. The effect of any such additives should be evaluated as to their result and impact on other properties of the composition.

The addition curable composition of this invention may be prepared by mixing all the ingredients together. When all of the ingredients are mixed together, the composition will begin to cure unless a cure inhibitor is present. If the composition is not to be used immediately after mixing, it should be prepared in at least two parts. Separating the crosslinker, alkoxy silicon compound and, if used, the (epoxy-functional organo)trialkoxysilane in one part and placing the catalyst and the titanium compound in another part is the preferred way to make a two part system. At the time of application, the contents of the two parts are mixed together and curing occurs.

In a more preferred embodiment, if fillers are used and shelf stability is desired, a molecular sieve dessicant may be added to the part containing the crosslinker, alkoxy silicon compound, (epoxy-functional organo)trialkoxysilane and fillers. As described in more detail in Kalinowski, Ser. No. 08/984,359 "Filled Addition Curable Compositions Having Reduced Gassing And Increased Shelf Stability," which is incorporated herein by reference, the molecular sieve dessicant reduces gassing that may occur due to reaction of the Si-H crosslinker with moisture in the filler. This will result in a two package composition having increased shelf stability, in addition to the benefits provided by this invention.

The inventors have determined that the addition of an alkoxy-silicon compound, a titanium compound and in preferred embodiments an (epoxy-functional organo) trialkoxysilane to an alkenyl functional organic polymer, an hydrosilyl functional crosslinker and catalyst enables the composition upon curing to have self adhesion to substrates.

Another preferred embodiment of this invention is a method of adhering an addition curable composition to a substrate surface comprising the steps of:

(i) treating a substrate surface with moisture or a moisture containing mixture to form a discontinuous film of moisture on the substrate surface; and (ii) applying an addition curable composition comprising a product formed from the components described above.

In essence, a substrate surface is treated with moisture or a moisture containing mixture to form a discontinuous film of moisture on the substrate surface and the addition curable compound is then applied.

The substrates for which this method is useful and self adhesion occurs, include glass, aluminum, stainless steel and galvanized steel with adhesion to glass, aluminum and stainless steel being most effective.

The moisture containing mixtures include combinations of water and miscible organic solvents such as isopropanol (IPA), methylethylketone and acetone. As used herein, the term "miscible organic solvent" means an organic solvent capable of having water dissolved in it.

The term "discontinuous film" as used herein means a film of moisture which is not macroscopically visible or in other words is not visible upon inspection with the naked eye.

The manner in which the substrate surface is treated depends on the compounds used to treat and can be determined experimentally. In order to ensure that the addition curable compound will "wet" or in other words spread on the substrate surface without being repelled when applied, there is a restriction to the manner of treatment that the film of moisture that forms on the substrate must be discontinuous.

Some useful methods include, for example, placing the substrate in a high moisture environment, spraying the substrate with moisture or a moisture containing mixture followed by air drying until moisture is not visible upon inspection. In a preferred method, a substrate surface is treated with a mixture of IPA and water, the surface is air dried until moisture is not visible upon inspection and the addition curable composition is then applied. Upon curing the addition curable compound will have self adhesion to the substrate.

The following examples are presented for illustrative purposes and should not be construed as limiting the present invention which is delineated in the claims.

EXAMPLE 1

7.5 g $CH_2=CH(CH_2)_6CH(Cl)CH_2((CH_3)_2C-CH_2)_m$ $(CH_3)_2$ $C$-phenyl-$C(CH_3)_2(CH_2(CH_3)_2C)_nCH_2CH(Cl)$ $(CH_2)_6CH=CH_2$, $M_n=9,400$, polydispersity $Mw/Mn=1.2$, with m and n being about equal and m+n being about 160, manufactured by Kaneka Corporation (decadiene PIB) and 7.5 g Panalane L-14e, a low molecular weight polybutene polymer having a viscosity of less than 320 cs, manufactured by Amoco Chemical Company (PB Polymer) were placed in a jar and hand mixed until homogeneous (about: 15 min). Next, 0.25 g of a SiH crosslinker composed of mainly methylhydrogensiloxane cyclic tetramer and pentamer, having a % H as SiH=1.487 ([MeHSiO] cyclics) giving an SiH:Alkenyl ratio of approximately 2.3, were mixed into the above material along with 0.17 g tetraethylorthosilicate (TEOS) and 0.05 g tetraisopropyl titanate (TPT). Next, 0.20 g of a platinum-containing complex which is the neutralized reaction product of chloroplatinic acid and sym-divinyltetramethyldisiloxane having a platinum concentration of 0.2% by weight (giving 54 parts platinum per million parts decadiene PIB, ie. ppm) was added and the mixture stirred by hand until homogeneous (about 30 sec). The material was then placed on glass slides and aluminum pans and cured in an oven at 78° C. for 10 min. The cured material was still tacky to the touch and provided good self adhesion to glass and aluminum.

EXAMPLE 2

Samples were prepared as described in Example 1 except 0.07 g of 3-glycidoxypropyltrimethoxysilane (GOPTMS) was added with the TEOS and TBT. The material was then placed on glass slides and aluminum pans and cured in an oven at 78° C. for 10 min. The cared material was still tacky to the touch and provided very good self adhesion to glass and aluminum.

EXAMPLE 3

(A) 420 g Epion polymer, an allyl ended functional polyisobutylene polymer having a molecular weight of 10,000 Mn and an alkenyl functionality of approximately 1.7, manufactured by Kaneka Corporation (Allyl PIB) and 420 g PB Polymer were placed in a Ross mixer and mixed under vacuum for approximately 15 min to remove air and provide a homogeneous mixture. 210 g CS-13, a surface treated ground calcium carbonate filler manufactured by Georgia Marble (GCC), 30 g of 5 Angstrom Molecular Sieves, absorbent sieves having an average cavity size of 5 angstroms manufactured by Advanced Specialty Gas Equipment, and 420 g Winnofil SPM, a surface treated precipitated calcium carbonate filler manufactured by ICI (PCC) were added and mixed at 20 rpm until dispersed into the polymer and then mixing was increased to 65 rpm under vacuum for 10 min.

(B) Various samples were prepared by mixing 0.11 g TEOS, 0.05 g GOPTMS, at least one Si-H crosslinker as described in Table 1 and a titanium compound as described in Table 1, into 30 g of the material prepared in Example 3(A) by hand until homogeneous (about 2 min). Next, 0.2 g of a solution of a platinum vinylsiloxane complex having a platinum concentration of 0.5% by weight (48 ppm Pt) was mixed in by hand until homogeneous. The material was placed onto glass slides and allowed to cure for 3 days at 23±2° C., 55±5% relative humidity. After curing, samples were tested by tab adhesion (cured samples pulled from the glass with index finger and thumb). A qualitative measurement of adhesion was noted as poor (no force required to remove), good (some force required to remove) or excellent (cohesive failure). Samples 3 and 6 both gave excellent results, however, sample 3 was tacky and sample 6 was tack free. See the results in Table 1.

TABLE 1

| Samples | Crosslinkers (g) A* | Crosslinkers (g) B** | SiH/ Alkenyl | Titanate (g) | Adhesion |
|---|---|---|---|---|---|
| 1 | 0.14 | — | 0.75 | 0.03 TPT[a] | poor |
| 2 | 0.14 | — | 0.75 | 0.25 TPT | good |
| 3 | — | 0.07 | 0.73 | 0.03 TPT | excellent |
| 4 | 0.07 | 0.04 | 0.79 | 0.03 TPT | poor |
| 5 | 0.14 | — | 0.75 | 0.03 Tyzor DC[b] | good |
| 6 | 0.07 | 0.04 | 0.79 | 0.03 Tyzor DC | excellent |

*$Me_3SiO(MeHSiO)_5(Me_2SiO)_3SiMe_3$ (% H as SiH - 0.76)
**[MeHSiO] cyclics (% H as SiH - 1.487)
[a]Tetraisopropyl titanate manufactured by Dupont Chemical
[b]Titanium diisopropoxy-bis-ethylacetoacetate manufactured by Dupont Chemical

EXAMPLE 4

Samples were prepared as in Example 3, using 20 g of the material prepared in Example 3(A), 0.14 g $Me_3SiO(MeHSiO)_5(Me_2SiO)_3SiMe_3$ (% H as SiH-0.76), 0.07 g [MeHSiO] cyclics (% H as SiH-1.487), 0.22 g TEOS, 0.07 g Tyzor DC and 0.13 g GOPTMS and 0.4 g of a solution of a platinum vinylsiloxane complex having a platinum concentration of 0.2% by weight (145 ppm Pt). The SiH:Alkenyl ratio was approximately 2.2. The mixture was then placed onto glass, aluminum (alum) and stainless steel (ss) slides.

The slides' surfaces were prepared in 3 ways; 1) no treating, 2) treating with acetone and air drying, and 3) treating with water then isopropanol and air drying. Treating was carried out by wetting a paper towel with water, acetone or isopropanol and wiping the surface of the slide. All surfaces were air dried, i.e exposed to the laboratory environment until they appeared dry under visual inspection and samples applied immediately thereafter. The samples were allowed to cure at 23±2° C., 55±5% relative humidity and tested by tab adhesion at 3, 5, and 7 days. A qualitative measurement of adhesion was noted as poor (no force required to remove), good (some force required to remove) or excellent (cohesive failure). The results of the study are shown in Table 2. Test 3 shows the best overall adhesion after 7 days.

TABLE 2

|  | Test 1 No Treatment | | | Test 2 Acetone Treatment | | | Test 3 Water/IPA Treatment | | |
| --- | --- | --- | --- | --- | --- | --- | --- | --- | --- |
|  | glass | alum | ss | glass | alum | ss | glass | alum | ss |
| Day 3 | 1 | 1 | 1 | 2 | 1 | 1 | 3 | 1 | 1 |
| Day 5 | 2 | 1 | 1 | 2 | 1 | 2 | 3 | 2 | 2 |
| Day 7 | 2 | 1 | 1 | 2 | 1 | 2 | 3 | 3 | 3 |

1 = poor (adhesive failure - no force required to remove)
2 = good (adhesive failure - sotne force required to remove)
3 = excellent (cohesive failure)

We claim:

1. An addition curable composition comprising a product formed from components comprising:
   (A) 100 parts by weight of an organic polymer having on average at least 1.4 alkenyl groups per molecule; (B) an amount sufficient to cure the composition of a crosslinker having on average at least 1.4 hydrosilyl groups per molecule; (C) a platinum group metal-containing catalyst in an amount sufficient to effect curing of the composition; and an adhesion promoter consisting of (D) 0.1 to 4 parts by weight of an alkoxy-silicon compound selected from alkyl orthosilicates and alkylpolysilicates, where the alkyl groups of the alkyl orthosilicates and the alkylpolysilicates are methyl, ethyl, propyl or butyl, (E) 0.1 to 1 part by weight of a titanium compound having Ti—O—C bonds, and (F) 0.1 to 1 part by weight of an (epoxy-functional organo)trialkoxysilane.

2. The addition curable composition of claim 1, wherein the organic polymer has on average 1.8 to 3 alkenyl groups per molecule and is selected from the group consisting of a polyether, a polyester, a polybutylene, a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

3. The addition curable composition of claim 2 wherein at least 50 mole percent of the repeat units of the organic polymer are isobutylene units.

4. The addition curable composition of claim 3, wherein the organic polymer has on average 1.8 to 4 alkenyl groups per molecule and at least 80 mole percent of the repeat units are isobutylene units.

5. The addition curable composition of claim 4, wherein the organic polymer, other than the alkenyl groups, is a homopolymer consisting essentially of isobutylene repeat units.

6. The addition curable composition of claim 2, wherein the amount of the crosslinker added to the composition provides a ratio of hydrosilyl groups to alkenyl groups of the organic polymer within a range of about 0.65:10 to 10:1.

7. The addition curable composition of claim 3, wherein the amount of the crosslinker added to the composition provides a ratio of hydrosilyl groups to alkenyl groups of the organic polymer within a range of about 1:1 to 5:1 and the crosslinker is an organohydrogensiloxane.

8. The addition curable composition of claim 5, wherein the amount of crosslinker added to the composition provides a ratio of hydrosilyl groups to alkenyl groups of the organic polymer within a range of about 1:1 to 2.2:1 and the crosslinker is selected from methylhydrogensiloxane cyclics [(Me)(H)SiO]$_s$ where s is from 4 to 10 and methylhydrogensiloxane linears (Me)$_3$SiO((Me)(H)SiO)$_m$((Me)$_2$SiO)$_n$Si(Me)$_3$ where m is from 3 to 10 and n is from 1 to 5, in each case where Me is methyl.

9. The addition curable composition of claim 7, wherein the platinum group metal containing catalyst comprises platinum and the amount added to the composition is at least 5 parts by weight of platinum based on 1 million parts of the organic polymer.

10. The addition curable composition of claim 8, wherein the platinum group metal containing catalyst is a solution of a platinum vinylsiloxane complex and the amount added to the composition is from about 10 parts to 200 parts by weight of platinum based on 1 million parts of the organic polymer and for the crosslinker m is 5 and n is 3.

11. The addition curable composition of claim 2 wherein the product comprises from 0.5 to 3.5 parts by weight of the alkoxy-silicon compound, 0.1 to 0.6 parts of the titanium compound and 0.1 to 1 part by weight of the (epoxy-functional organo)trialkoxysilane.

12. The addition curable composition of claim 5 wherein the product comprises from 0.5 to 3.5 parts by weight of the alkoxy-silicon compound which is an alkyl orthosilicate, 0.1 to 0.6 parts of the titanium compound which is selected from tetraalkyltitanates and titanium chelates and 0.1 to 1 part by weight of the (epoxy-functional organo)trialkoxysilane where the alkoxy groups are methoxy.

13. The addition curable composition of claim 8 wherein the product comprises from 0.8 to 3.5 parts by weight of the alkoxy-silicon compound which is an alkyl orthosilicate and from 0.1 to 0.5 parts of the titanium compound which is which is selected from tetraisopropyltitanate and titanium diisopropoxy-bis-ethylacetoacetate and from 0.3 to 0.8 parts by weight of the (epoxy-functional organo)trialkoxysilane where the alkoxy groups are methoxy.

14. The addition curable composition of claim 10 wherein the product comprises from 0.8 to 3.5 parts by weight of the alkoxy-silicon compound which is selected from ethyl orthosilicate and n-propyl orthosilicate, from 0.1 to 0.5 parts of the titanium compound which is titanium diisopropoxy-bis-ethylacetoacetate and from 0.3 to 0.8 parts by weight of the (epoxy-functional organo)trialkoxysilane which is 3-glycidoxypropyltrimethoxysilane.

15. The addition curable composition of claim 11, and further comprising an inhibitor.

16. A method of adhering an addition curable composition to a substrate surface comprising the steps of:
   (i) treating a substrate surface with moisture or a moisture containing mixture, in addition to any atmospheric moisture present on the substrate surface, so to form a discontinuous film of moisture on the substrate surface; and
   (ii) applying an addition curable composition comprising a product formed from components comprising (A) 100 parts by weight of an organic polymer having on average at least 1.4 alkenyl groups per molecule, (B) an amount sufficient to cure the composition of a crosslinker having on average at least 1.4 hydrosilyl groups per molecule, (C) a platinum group metal-containing catalyst in an amount sufficient to effect curing of the composition, and an adhesion promoter consisting of (D) 0.1 to 4 parts by weight of an alkoxy-silicon compound selected from alkyl orthosilicates and alkylpolysilicates, where the alkyl groups of the alkyl orthosilicates and the alkylpolysilicates are methyl, ethyl, propyl or butyl, (E) 0.1 to 1 part by weight of a titanium compound having Ti—O—C bonds, and (F) 0.1 to 1 part by weight of an (epoxy-functional organo)trialkoxysilane, to the substrate surface.

17. The method of claim 16, wherein the organic polymer has on average 1.8 to 8 alkenyl groups per molecule and is selected from the group consisting of a polyether, a polyester, a polybutylene, a polyisoprene, a polybutadiene, a copolymer of isobutylene and isoprene, a copolymer of isoprene and butadiene, a copolymer of isoprene and styrene, a copolymer of butadiene and styrene, a copolymer of isoprene, butadiene and styrene and a polyolefin polymer prepared by hydrogenating polyisoprene, polybutadiene or a copolymer of isoprene and styrene, a copolymer of butadiene and styrene or a copolymer of isoprene, butadiene and styrene.

18. The method of claim 17, wherein the organic polymer, other than the alkenyl groups, is a homopolymer consisting essentially of isobutylene repeat units.

19. The method of claim 18, wherein the amount of crosslinker added to the composition provides a ratio of hydrosilyl groups to alkenyl groups of the organic polymer within a range of about 0.65:10 to 10:1.

20. The method of claim 19, wherein the amount of crosslinker added to the composition provides a ratio of hydrosilyl groups to alkenyl groups of the organic polymer within a range of about 1:1 to 2.2:1 and the crosslinker is selected from methylhydrogensiloxane cyclics [(Me)(H)SiO]$_s$ where s is from 4 to 10 and methylhydrogensiloxane linears (Me)$_3$SiO((Me)(H)SiO)$_m$((Me)$_2$SiO)$_n$Si(Me)$_3$ where m is from 3 to 10 and n is from 1 to 5, in each case where Me is methyl.

21. The method of claim 20, wherein the platinum group metal-containing catalyst comprises platinum and the amount added to the composition is at least 5 parts by weight of platinum based on 1 million parts of the organic polymer.

22. The addition curable composition of claim 21, wherein the platinum group metal-containing catalyst is a solution of a platinum vinylsiloxane complex and the amount added to the composition is from about 10 parts to 200 parts by weight of platinum based on 1 million parts of the organic polymer and for the crosslinker m is 5 and n is 3.

23. The method of claim 17 wherein the product comprises from 0.5 to 3.5 parts by weight of the alkoxy-silicon compound, 0.1 to 0.6 parts of the titanium compound and 0.1 to 1 part by weight of the (epoxy-functional organo) trialkoxysilane.

24. The method of claim 20 wherein the product comprises from 0.8 to 3.5 parts by weight of the alkoxy-silicon compound which is an alkyl orthosilicate, 0.1 to 0.6 parts of the titanium compound which is selected from tetraalkyltitanates and titanium chelates and 0.1 to 1 part by weight of the (epoxy-functional organo)trialkoxysilane where the alkoxy groups are methoxy.

25. The method of claim 22 wherein the product comprises from 0.8 to 3.5 parts by weight of the alkoxy-silicon compound which is selected from ethyl orthosilicate and n-propyl orthosilicate, from 0.1 to 0.5 parts of the titanium compound which is selected from tetraisopropyltitanate and titanium diisopropoxy-bis-ethylacetoacetate and from 0.3 to 0.8 parts by weight of the (epoxy-functional organo) trialkoxysilane which is 3-glycidoxypropyltrimethoxysilane.

26. The method of claim 16, and further comprising mixing an inhibitor with the addition curable composition.

27. The method of claim 16 wherein the substrate is glass, aluminum, stainless steel or galvanized steel.

28. The method of claim 24 wherein the substrate is glass, aluminum or stainless steel and the moisture containing mixture is a mixture of water and a miscible organic solvent.

29. The method of claim 25 wherein the substrate is glass, aluminum, or stainless steel and the moisture containing mixture is a mixture of water and isopropanol.

30. The cured composition prepared by the method of claim 16.

* * * * *